(12) United States Patent
Anraku et al.

(10) Patent No.: US 9,122,597 B2
(45) Date of Patent: Sep. 1, 2015

(54) INFORMATION PROCESSING APPARATUS, INFORMATION PROCESSING METHOD AND MEDIUM STORING PROGRAM

(75) Inventors: Takafumi Anraku, Kawasaki (JP); Fumiaki Yamana, Sunnyvale, CA (US); Hiroshi Kondou, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 13/605,369

(22) Filed: Sep. 6, 2012

(65) Prior Publication Data

US 2012/0331266 A1 Dec. 27, 2012

Related U.S. Application Data

(63) Continuation of application No. PCT/JP2010/053898, filed on Mar. 9, 2010.

(51) Int. Cl.
*G06F 12/10* (2006.01)
*G06F 11/07* (2006.01)

(52) U.S. Cl.
CPC .......... *G06F 11/073* (2013.01); *G06F 11/0724* (2013.01); *G06F 11/0778* (2013.01)

(58) Field of Classification Search
CPC ... G06F 12/10; G06F 11/073; G06F 11/0724; G06F 11/0778
USPC .......... 711/202, 203, 206, 207, 210, E12.061; 345/568; 365/49.17
See application file for complete search history.

(56) References Cited

U.S. PATENT DOCUMENTS

| 6,931,510 | B1 * | 8/2005 | Damron ........................ 711/207 |
| 2005/0108497 | A1 | 5/2005 | Bridges et al. |
| 2006/0271919 | A1 * | 11/2006 | Moyer ........................... 717/136 |
| 2007/0005933 | A1 * | 1/2007 | Kopec et al. .................. 711/207 |
| 2007/0050594 | A1 | 3/2007 | Augsburg et al. |
| 2007/0094476 | A1 | 4/2007 | Augsburg et al. |
| 2008/0077780 | A1 | 3/2008 | Zingher |

(Continued)

FOREIGN PATENT DOCUMENTS

| CN | 1617111 A | 5/2005 |
| JP | 63-273149 | 1/1988 |
| JP | 2-227747 | 9/1990 |

(Continued)

OTHER PUBLICATIONS

Byran S Rosenburg, "Low-Synchronization Translation Lookaside Buffer Consistency in Large-Scale Shared Memory Multiprocessors", SOSP '89 Proceedings of the twelfth ACM symposium on Operating systems principles, Nov. 1 1989, pp. 137-146.*

(Continued)

*Primary Examiner* — Cheng-Yuan Tseng
*Assistant Examiner* — Kamal K Dewan
(74) *Attorney, Agent, or Firm* — Staas & Halsey LLP

(57) ABSTRACT

Disclosed is an information processing device provided with: a plurality of processing units each having a TLB (Translation Lookaside Buffer); a means for acquiring a designation of a processing unit, from among the plurality of processing units, where TLB information is to be collected, and for acquiring a designation of the timing at which the TLB information is to be collected; and a means for collecting the TLB information from the designated processing unit at the designated timing.

9 Claims, 9 Drawing Sheets

(56) References Cited

U.S. PATENT DOCUMENTS

| | | | |
|---|---|---|---|
| 2008/0098196 A1* | 4/2008 | Miyamoto | 711/203 |
| 2009/0063907 A1* | 3/2009 | Tsuboi et al. | 714/48 |

FOREIGN PATENT DOCUMENTS

| | | |
|---|---|---|
| JP | 3-100855 | 4/1991 |
| JP | 5-88934 | 4/1993 |
| JP | 6-309196 | 11/1994 |
| JP | 2007-500401 | 1/2007 |
| JP | 2009-506434 | 2/2009 |
| JP | 2009-512943 | 3/2009 |

OTHER PUBLICATIONS

Korean Office Action mailed Nov. 20, 2013 in corresponding Korean Application No. 10-2012-7023447.
English Translation of the International Preliminary Report on Patentability issued Oct. 11, 2012 in corresponding International Patent Application No. PCT/JP2010/053898.
Notice of Reason for Rejection, dated Apr. 9, 2013, in corresponding Japanese Application No. 2012-504195 (4 pp.).
International Search Report of PCT/JP2010/053898 mailed Jun. 8, 2010.
Chinese Office Action issued Jul. 3, 2014 in corresponding Chinese Patent Application No. 201080065233.X.

* cited by examiner

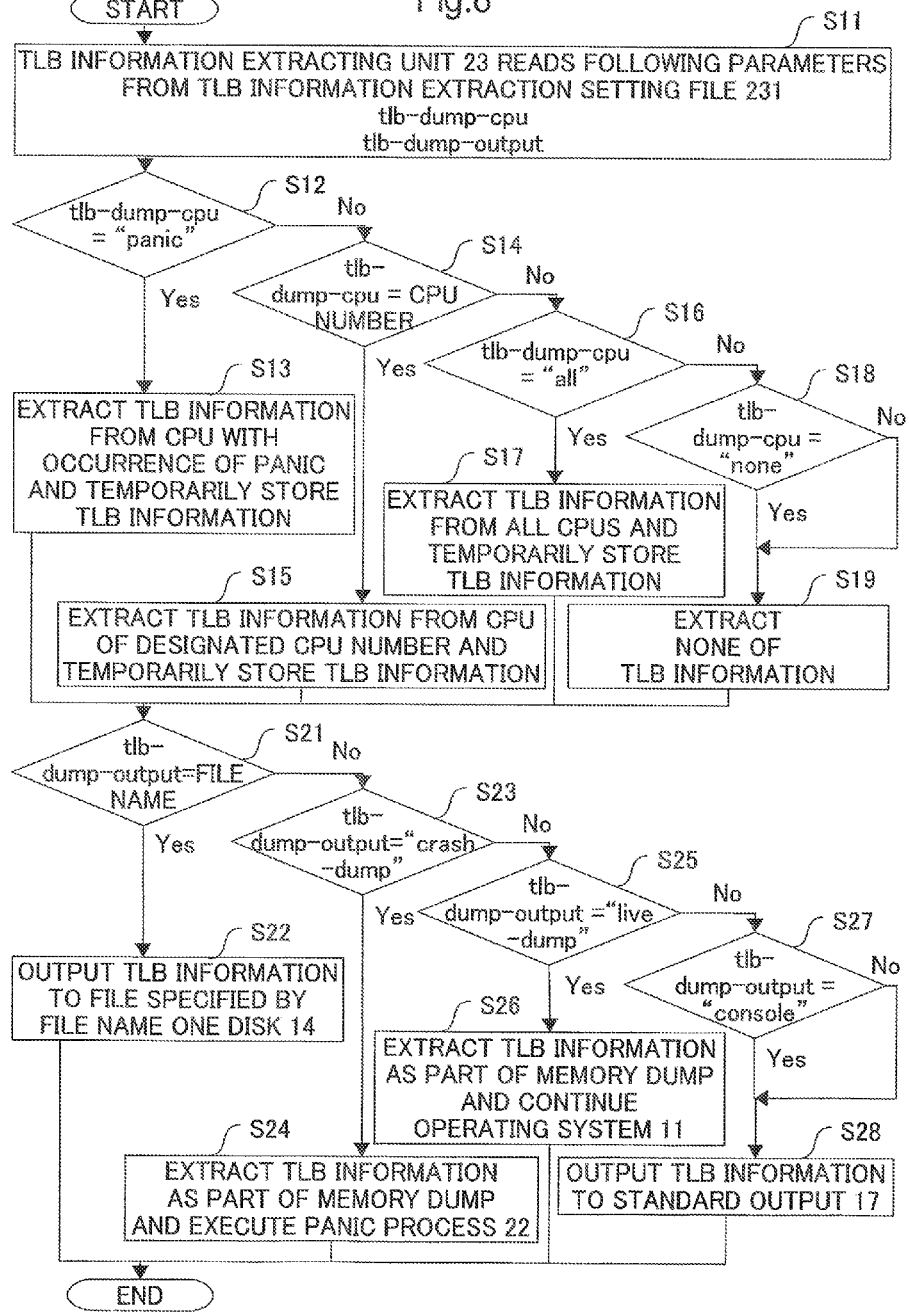

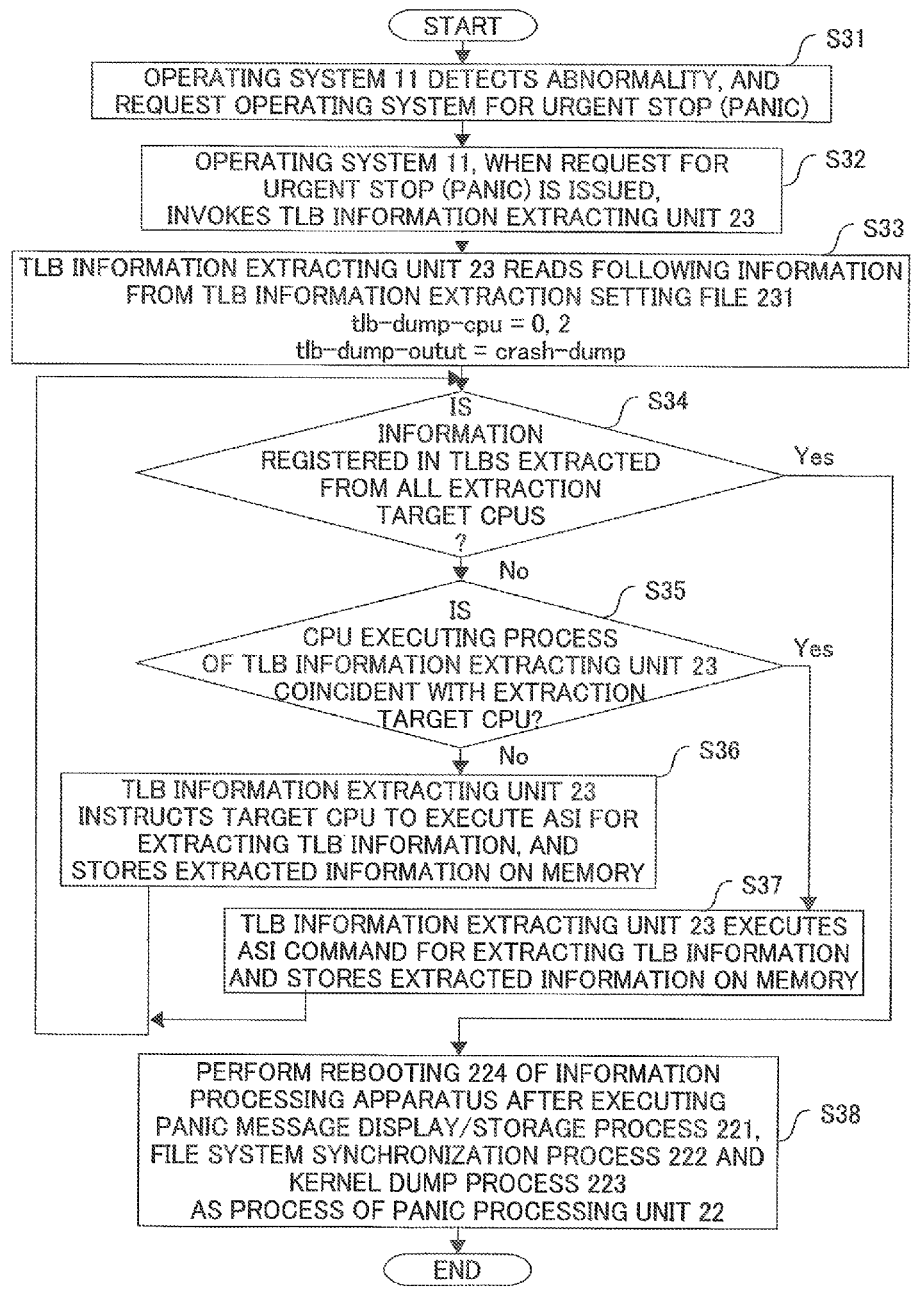

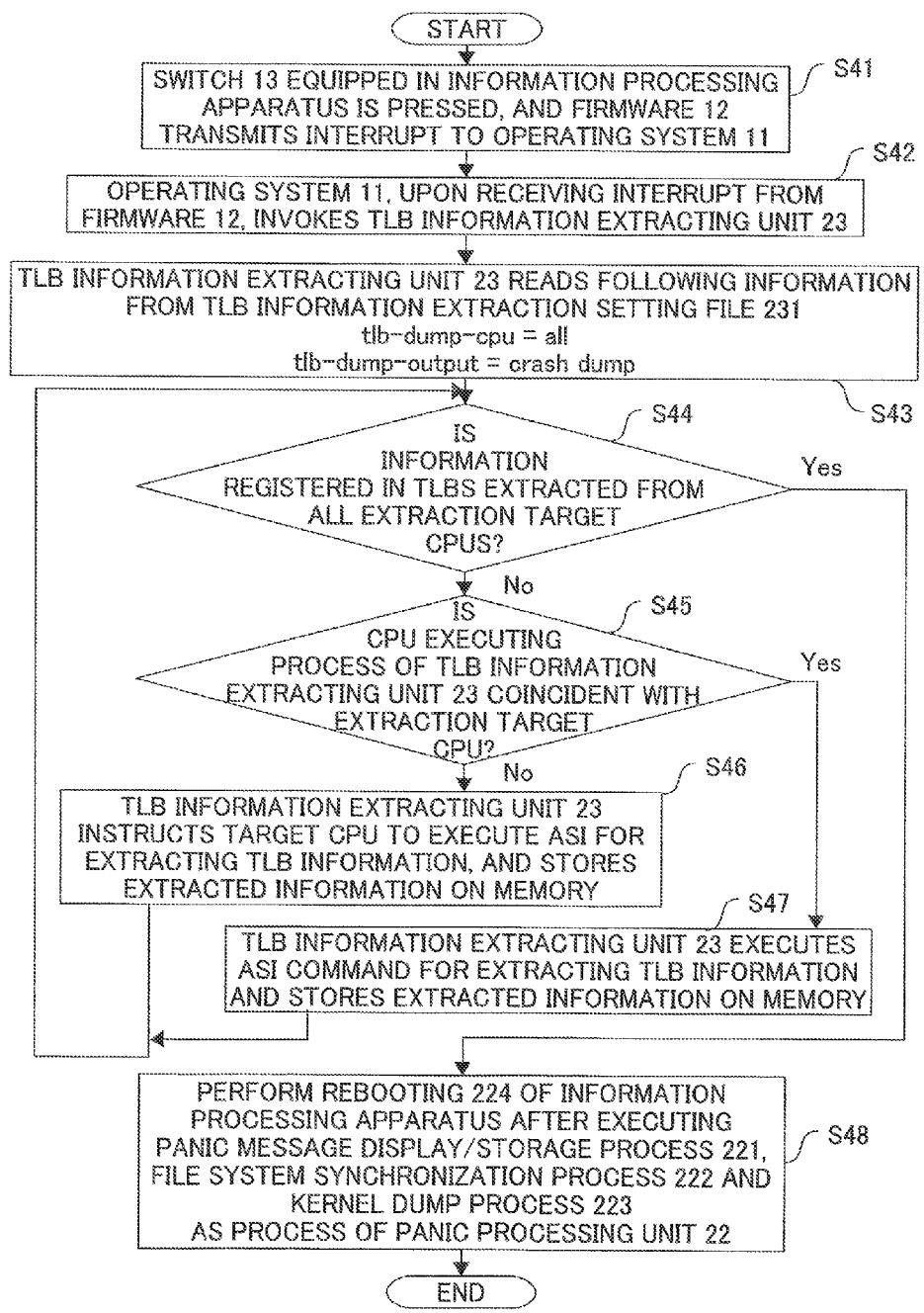

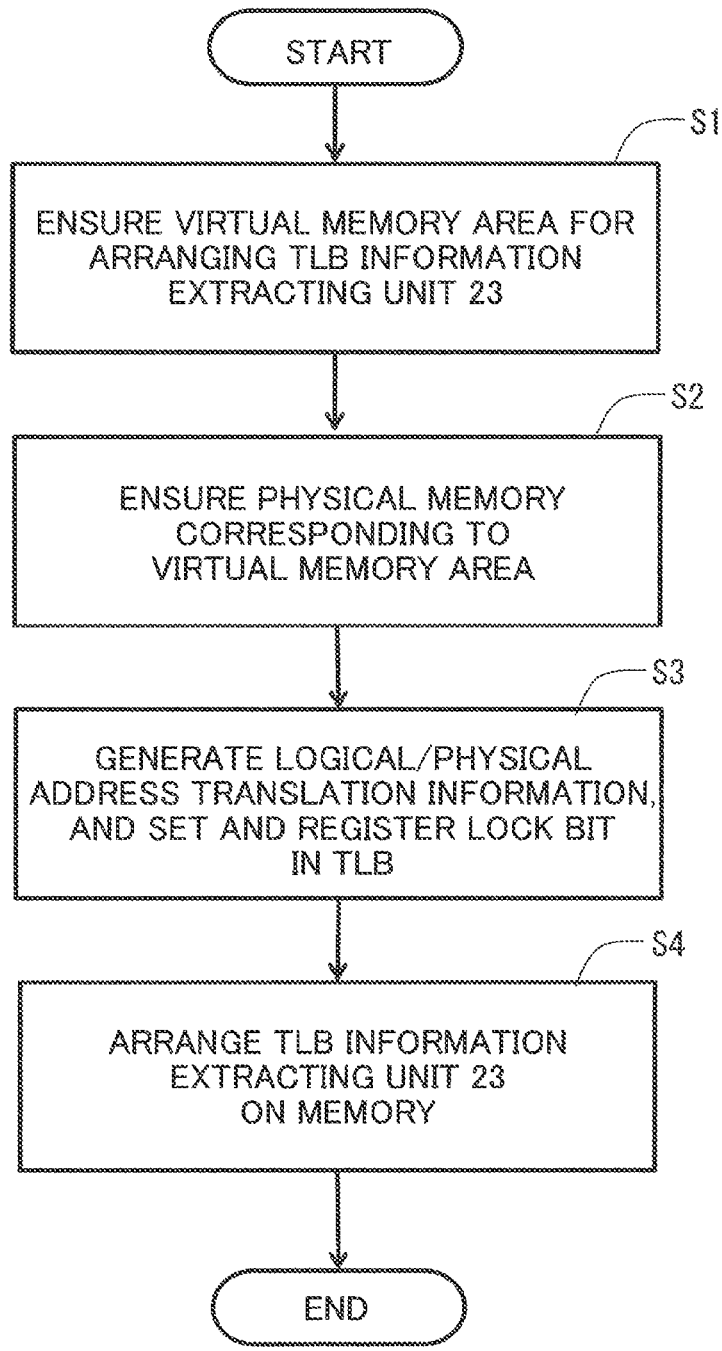

INFORMATION PROCESSING APPARATUS, INFORMATION PROCESSING METHOD AND MEDIUM STORING PROGRAM

CROSS-REFERENCE TO RELATED APPLICATIONS

This is a continuation of Application PCT/JP2010/053898, filed on Mar. 9, 2010, now pending, the entire contents of which are incorporated herein by reference.

FIELD

The present invention relates to a technology of extracting information registered in a TLB (Translation Lookaside Buffer).

BACKGROUND

Some of computers have implementation of the TLB (Translation Lookaside Buffer). For example, an operating system sets the address translation information to the TLB in order to cache the information. The address translation information is such as a physical address associated with a logical address of each virtual space or a map size.

The TLB exists within a CPU (Central Processing Unit) of the computer and is configured to speed up the translation from the virtual address into the physical address. The TLB has a number of entries and registers, in each entry, the information is stored, which is used for the operating system to perform the translation from the virtual address into the physical address.

If having an access to the virtual address while the CPU executes a command, the CPU searches for the information registered by the operating system in the TLB. Normally, the virtual address is used as a search key, and a physical address associated with the virtual address is returned as a search result. If the information corresponding to the virtual address exists in the TLB, the address translation is executed very quickly, and the CPU accesses the memory by use of the physical address acquired from the TLB. Whereas if the information corresponding to the virtual address does not exist in the TLB, the CPU generates a trap (interrupt) and notifies the operating system that there is no information in the TLB. The operating system receiving the trap registers the information corresponding to the virtual address in the TLB and resubmits the command. When resubmitting the command, the information corresponding to the virtual address is registered in the TLB, and therefore the CPU can access the memory by using the information corresponding to the virtual address.

If the information in the TLB is corrupted due to a fault of the operating system, it follows that the CPU accesses unexpected physical address. The access to the unexpected physical address leads to a possibility of causing a serious problem such as a malfunction of the computer and data corruption. As a matter of fact, there is an instance of causing an erroneous registration of the TLB entry due to the fault of the operating system and further causing hang-up of the system or the malfunction of the program. Therefore, a means for checking the information registered in the TLB of each CPU or a means for checking whether or not a process of the operating system, relating to TLB, runs correctly is desired.

A tool has hitherto been prepared for the purpose of extracting the information for examining a cause of a trouble such as the fault of the operating system and checking the operation (regression test) thereof. For example, it is sufficient for a computer administrator to execute the tool such as an operation checking command in firmware (Service Processor) which manages the computer. On the occasion of executing the operation checking command, the computer administrator designates the CPU as an operation checking target. Through the execution of the operation checking command, the computer administrator can acquire the information registered in the TLB of the designated CPU. For instance, in the case of an UltraSPARC processor system, as the operation checking command prepared in the firmware is started up, the firmware executes an ASI (Address Space Identifiers) command for extracting the TLB information. With the ASI command for extracting the TLB information, the firmware acquires the information registered in the TLB and displays the acquired information to the computer administrator. Details of the ASI command for extracting the information registered in the TLB are described in Chapter 6 of the Manual (UltraSPARC User's Manual Revision 2, July 1997) of the UltraSPARC processor.

[Patent document 1] Japanese National Publication of International Patent Application No. 2007-500401
[Patent document 2] Japanese Laid-open Patent Publication No. 63-273149

SUMMARY

An information processing apparatus is exemplified as one aspect for solving the problems given above. An information processing apparatus includes: a plurality of processing units to each have a TLB (Translation Lookaside Buffer); means to acquire designation of the processing unit from which the TLB information is extracted in the plurality of processing units and designation of a timing when the TLB information is extracted; and means to extract the TLB information from the designated processing unit at the designated timing.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 6 is a diagram illustrating a detailed example of a TLB extraction process.

FIG. 7 is a flowchart illustrating an operation of the information processing apparatus according to a second working example.

FIG. 8 is a flowchart illustrating a process when a system administrator presses a switch.

FIG. 9 is a flowchart illustrating a process of locking a TLB entry.

DESCRIPTION OF EMBODIMENTS

An information processing apparatus according to one embodiment will hereinafter be described with reference to the drawings. A configuration in the following embodiment is an exemplification, and the present invention is not limited to the configuration in the embodiment.

FIRST WORKING EXAMPLE

Figure 1:
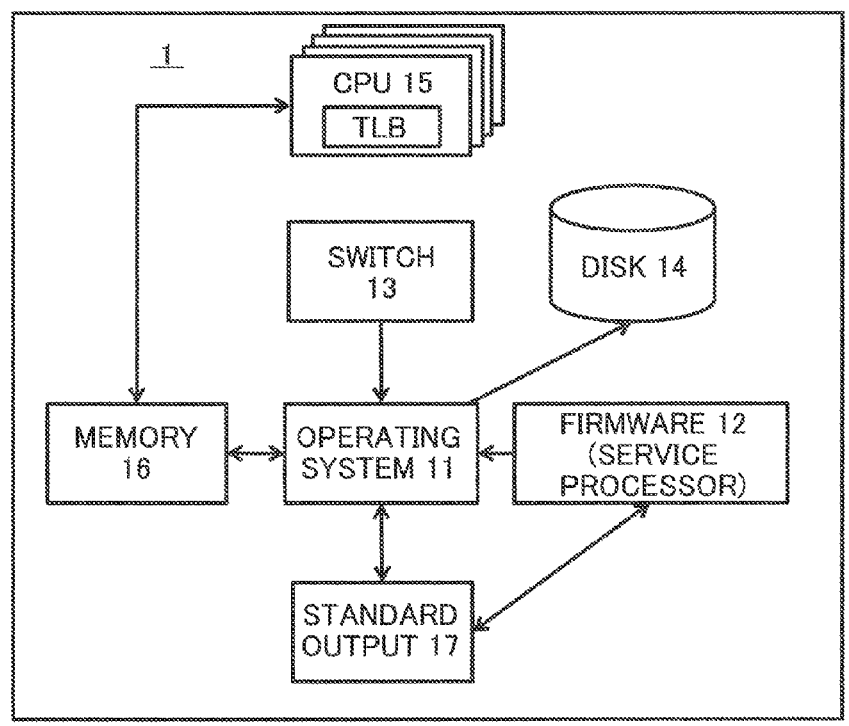
FIG. 1 is a block diagram illustrating a relation between hardware and functions of an information processing apparatus of a first working example.

An information processing apparatus 1 according to a first working example will hereinafter be described with reference to FIGS. 1 through 6. FIG. 1 is a block diagram illustrating a relation between pieces of hardware and functions of the information processing apparatus 1. The information processing apparatus 1 includes an operating system 11, firmware 12 (Service Processor), a switch 13 equipped in the apparatus, a disk 14, a CPU 15 and a memory 16.

In the information processing apparatus 1 of the first working example, the CPU 15 includes, e.g., a plurality of virtual CPUs. Herein, the virtual CPU connotes, as viewed from the operating system 11, a virtual device including a combination of a processor for executing a program and a register group which retains an execution status of the program. Herein, a meaning of the "virtual" embraces an implication that it is feasible to provide a larger number of program execution environments (i.e., the combinations of the processors and the register groups) than the program execution environments (platforms) based on the physical CPUs including the actually existing hardware, i.e., the physically existing register groups. The virtual CPU saves, in the memory 16, a first register group value representing a status of a program that is being processed by one physical CPU in the present CPU 15, while a second register group value saved in the memory 16 is written back to the register group of the physical CPU. The CPU 15 is provided with such an exchange function of the register group values, thereby providing the plurality of virtual CPUs to the operating system 11.

In place of the virtual CPUs, however, the CPU 15 may be a CPU which provides plural pieces of physical CPUs (which are also referred to as processor cores, cores, or physical processors), i.e., provides devices as pieces of physical hardware that execute the programs. In any case, in the first working example, the CPU 15 of the information processing apparatus 1 is to include, if viewed from the operating system 11, the plurality of execution environments for executing the programs. The virtual CPU or the physical CPU corresponds to a processing unit.

Moreover, each of the plurality of virtual CPUs (or physical CPUs) of the CPU 15 has a TLB (Translation Lookaside Buffer). Hereinafter, the CPU being referred to as the CPU 15 implies a system including the plurality of virtual CPUs or the plurality of physical CPUs. Further, the virtual CPU being included in the CPU 15 implies an individual program execution environment provided by the CPU 15 to the operating system 11. Still further, the physical CPU being included in the CPU 15 implies an individual processor core within the CPU 15.

Furthermore, the individual virtual CPU in the CPU 15 is specified by a CPU number. Further, if the CPU 15 does not have any mechanism of the virtual CPU, the CPU 15 provides the individual physical CPU as the program execution environment to the operating system 11. The individual physical CPU is also specified by the CPU number. Namely, in the case of being referred to as the CPU number in the first working example, the CPU number indicates a number for specifying the virtual CPU in the environment where the virtual CPU is provided. Moreover, in the environment where the virtual CPU is not provided, the CPU number given in the first working example indicates a number for specifying the physical CPU.

The memory 16 retains codes of the computer program executed by the CPU 15 or retains data. The data retained in the memory 16 contains the register group value representing the execution status of the computer program standing by for allocation of the virtual CPU in the CPU 15 and data processed by the CPU 15 with the execution of the computer program. The CPU 15 translates a virtual address into a physical address by use of the TLB and accesses the memory 16. The memory 16 includes a volatile DRAM (Dynamic Random Access Memory) and a nonvolatile ROM (Read Only Memory). The memory 16 is also called the main storage device.

The disk 14 is also called an external storage device. The computer program deployed on the memory 16 and the data are saved on the disk 14. The reason why called the external storage device contains an implication that the access takes a longer period of time than accessing the memory 16 as viewed from the CPU 15. The disk 14, however, retains the stored information even when a power source shuts down. The disk 14 includes a hard disk device, an input/output device for a portable storage device, an SSD (Solid State Drive), etc. Further, the portable storage device includes a drive device for a CD (Compact Disc), a DVD (Digital Versatile Disc), a BD (Blu-ray Disc), etc., or an input/output device for a memory card.

The operating system 11 runs on the CPU 15, controls the pieces of hardware such as the CPU 15, the memory 16 and the disk 14 of the information processing apparatus 1, and provides resources of the information processing apparatus 1 to the computer program executed by the CPU 15. The computer program in this case is called a user program or an application program in order to distinguish from a system program such as the operating system 11.

The firmware (Service Processor, which will hereinafter simply be referred to as the firmware 12) controls the information processing apparatus 1 and provides a management function. The firmware 12 is connected to the CPU 15 via an unillustrated dedicated line, inputs a predetermined command to the CPU 15, and receives a response to the command. For example, the firmware 12 acquires a present status of the CPU 15 by inputting an ASI command for acquiring the present status of the CPU 15, and diagnoses the execution status of the CPU 15.

The switch 13 accepts a user's operation and notifies the operating system 11 of having accepted the user's operation. The switch 13 gives the notification to the operating system 11 as triggered by occurrence of an event such as interrupt. When the interrupt occurs, the operating system 11 receives the occurrence of the interrupt from the CPU 15 according to a predetermined priority level. Accordingly, the switch 13 can be used as an urgent notification mechanism to the operating system 11 from the user, e.g., a system administrator of the information processing apparatus 1.

Note that the interrupt itself may be made to occur as a request for the CPU 15 from the firmware 12. Namely, when the system administrator presses the switch 13, to start with, the firmware 12 detects that the switch 13 was pressed. Then, the firmware 12 may notify the operating system 11 by the interrupt via the CPU 15 that the switch 13 was pressed. Further, the interrupt given to the operating system 11 from the firmware 12 is also generated by executing the command of the firmware 12 of the information processing apparatus 1. For example, when the system administrator or the program on the firmware executes the command of the firmware 12 which diagnoses the CPU 15, the firmware 12 notifies of the information corresponding to the CPU 15, e.g., the ASI command by the interrupt.

A standard output 17 is a virtual output destination for the information prepared by the operating system 11. The operating system 11 presumes, e.g., a terminal as the standard output. The terminal is also called a console. Further, the standard output is, in many cases, configured to be switchable to the external storage device such as the hard disk device owing to a switching function called "redirection".

<Function of Operating System 11>

The operating system 11 includes, e.g., a file management function, a memory management function, a process management function, etc. When the operating system 11 receives the notification (interrupt) from the information processing apparatus 1, executes a predetermined process. For example, the operating system 11, upon accepting an urgent stop request via the hardware of the CPU 15, makes an urgent stop. Moreover, in the first working example, e.g., the operating system 11 stores the information, which is registered in the TLB of the virtual CPU or the physical CPU designated beforehand in a setting file 231 by the system administrator, in an output destination designated in the setting file 231 by the system administrator, and then reboots the system.

Figure 2:
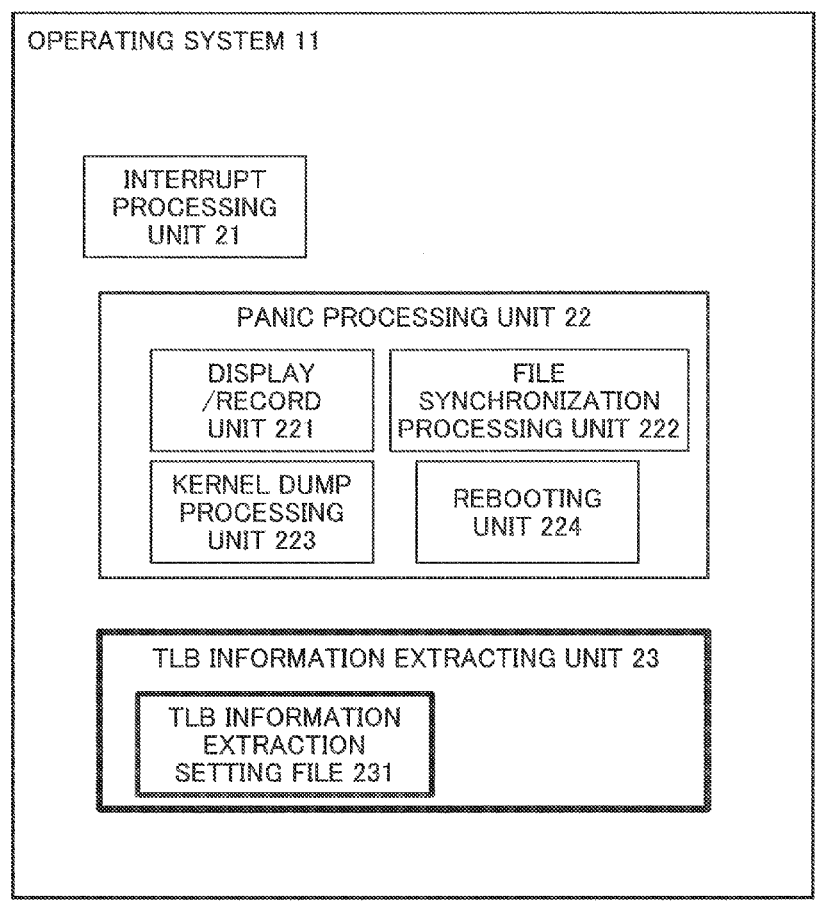
FIG. 2 is a diagram illustrating a detailed example of functions of an operating system.

FIG. 2 illustrates a detailed example of the functions of the operating system 11. As illustrated in FIG. 2, the operating system 11 includes an interrupt processing unit 21, a panic processing unit 22 and a TLB information extracting unit 23.

The interrupt processing unit 21, when the CPU 15 receives the interrupt, receives notification of the occurrence of the interrupt from the CPU 15. For example, the interrupt processing unit 21 can be exemplified as the CPU 15 that executes a program called a handler stored in an address that is set in an interrupt vector of the CPU 15. The interrupt processing unit 21 executes a process corresponding to a type of the interrupt.

The panic processing unit 22 is started when requested by the CPU 15 to urgently stop the operating system 11 via the interrupt processing unit 21. The urgent stop is also called a "panic". When the urgent stop is requested, the panic processing unit 22 executes a process related to the urgent stop.

For instance, as depicted in FIG. 2, the panic processing unit 22 includes a display/record unit 221, a file synchronization processing unit 222, a kernel dump processing unit 223 and a rebooting unit 224. The CPU 15 executes the computer program contained in the operating system 11, thereby functioning as the panic processing unit 22, e.g., the display/record unit 221, the file synchronization processing unit 222, the kernel dump processing unit 223 and the rebooting unit 224.

The display/record unit 221 outputs, e.g., along with the urgent stop, a message which the system administrator or the user is notified of, to the standard output, and displays the message on the unillustrated terminal, or records the message in a file on the disk 14. The message, of which the user is notified, includes a code or a message indicating a reason and a cause why the urgent stop is requested, information indicating a relevant portion, e.g., the hardware of the information processing apparatus 1 which the reason and the cause arise from, etc.

The file synchronization processing unit 222 writes, to the disk 14, the data not yet written to the disk 14 while being cached in an unillustrated cache memory in the data that are to be written to the disk 14.

The kernel dump processing unit 223 outputs a content of the memory 16 that is related to the urgent stop to the standard output, and displays the content on the unillustrated terminal or records the content in the file on the disk 14.

The rebooting unit 224, after completing the urgent stop, stands by for an instruction of, e.g., the system administrator and reboots the operating system 11.

The TLB information extracting unit 23 acquires the designation of the system administrator and extracts, based on the acquired designation, the information in the TLB within the CPU 15. The TLB information extracting unit 23 corresponds to a means to extract the TLB information.

The TLB information extracting unit 23 includes a TLB information extraction setting file (which will hereinafter be simply termed a setting file 231). The system administrator designates, in the setting file 231, a TLB information acquiring target timing, a TLB information acquiring target virtual CPU, a TLB information acquiring target physical CPU and an output destination of the acquired TLB information, etc. The setting file 231 is exemplified such as a file on the disk 14 and a table loaded onto the memory 16 from the file of the disk 14. The CPU 15 functions as a means to acquire the designation of the processing unit from which the TLB information is extracted and the designation of the timing when the TLB information is extracted by executing the computer program for reading the information of the setting file 231.

<Descriptive Example of Setting File 231>

(1) Designation of the Extraction Timing

In the case of designating the timing of extracting the information registered in the TLB, the system administrator previously puts descriptions in the setting file 231 as follows.

(1-1) When The Operating System 11 Urgently Stops (Panic);

The following is a setting example in the case of extracting the information registered in the TLB of the CPU, which is designated by "tlb-dump-cpu", at the panic occurrence time.
tlb-dump-timing="panic";

(1-2) When Initializing the Kernel During the Boot Process, i.e., a status where the terminal is not yet usable;

The following is a setting example in the case of extracting the information registered in the TLB of the CPU (the virtual CPU or the physical CPU), which is designated by "tlb-dump-cpu" when initializing the kernel during the boot process.
tlb-dump-timing="kernel-init";

(2) Designation of TLB Extracting Target CPU;

In the case of designating the target CPU (the virtual CPU or the physical CPU) from which to extract the information registered in the TLB, the system administrator previously puts the following descriptions in the setting file 231.

(2-1) Designation of the CPU which Urgently Stops Due to Occurrence of Some Abnormality:

The following is a setting example in the case of extracting the information registered in the TLB of the virtual CPU or the physical CPU which made the urgent stop. Note that in the case of the urgent stop of the virtual CPU or the physical CPU, the virtual CPU or the physical CPU making the urgent stop requests the operating system 11 for the urgent stop. Accordingly, the operating system 11 recognizes the virtual CPU or the physical CPU that has made the urgent stop. tlb-dump-cpu="panic";

(2-2) CPU Designation Based on CPU Number (Plural CPUs can be Designated);

If the system administrator desires to designate the virtual CPU or the physical CPU from which the TLB information is extracted, the following designation is made. For instance, the following is a setting example in the case of extracting the information registered in the TLBs of two CPUs of which CPU numbers are "0" and "2".
tlb-dump-cpu="0,2";

(2-3) All of Virtual CPUs or Physical CPUs Mounted in the CPU 15;

The following is a setting example in the case of extracting the information registered in the TLBs of all of the virtual CPUs or the physical CPUs mounted in the CPU 15. tlb-dump-cpu="all";

(2-4) No Designation of Target CPU (Extract None of the Information Registered in the TLB);

The following is a setting example in the case of extracting none of the information registered in the TLB. tlb-dump-cpu="none";

(3) In the case of designating the output destination of the information registered in the TLB, the system administrator puts the following descriptions in the setting file 231 beforehand.

(3-1) File

The following is a setting example in the case of outputting the information registered in the TLB to a file named /work/tlb-dump.txt.tlb-dump-output="/work/tlb-dump.txt";

(3-2) Crash Dump File;

The following is an example of outputting the TLB information to the file to extract the memory dump by urgently stopping the information processing apparatus 1. With the designation given below, the CPU 15 extracts the information registered in the TLB when urgently stopping the information processing apparatus 1 as a part of the memory dump, and reboots the information processing apparatus 1, i.e., the operating system 11.

tlb-dump-output="crash-dump";

(3-3) Live Dump (Extracting Memory Dump while System is Running);

The following is a setting example in the case of extracting the information registered in the TLB during the running of the information processing apparatus 1 as a part of the memory dump and continuing the operation of the information processing apparatus 1.

tlb-dump-output="live-dump";

(3-4) Terminal (also Called Console);

The following is a setting example in the case of outputting the information registered in the TLB to the console. tlb-dump-output="console";

<Processing Flowchart in System According to Comparative Example>

Figure 3:
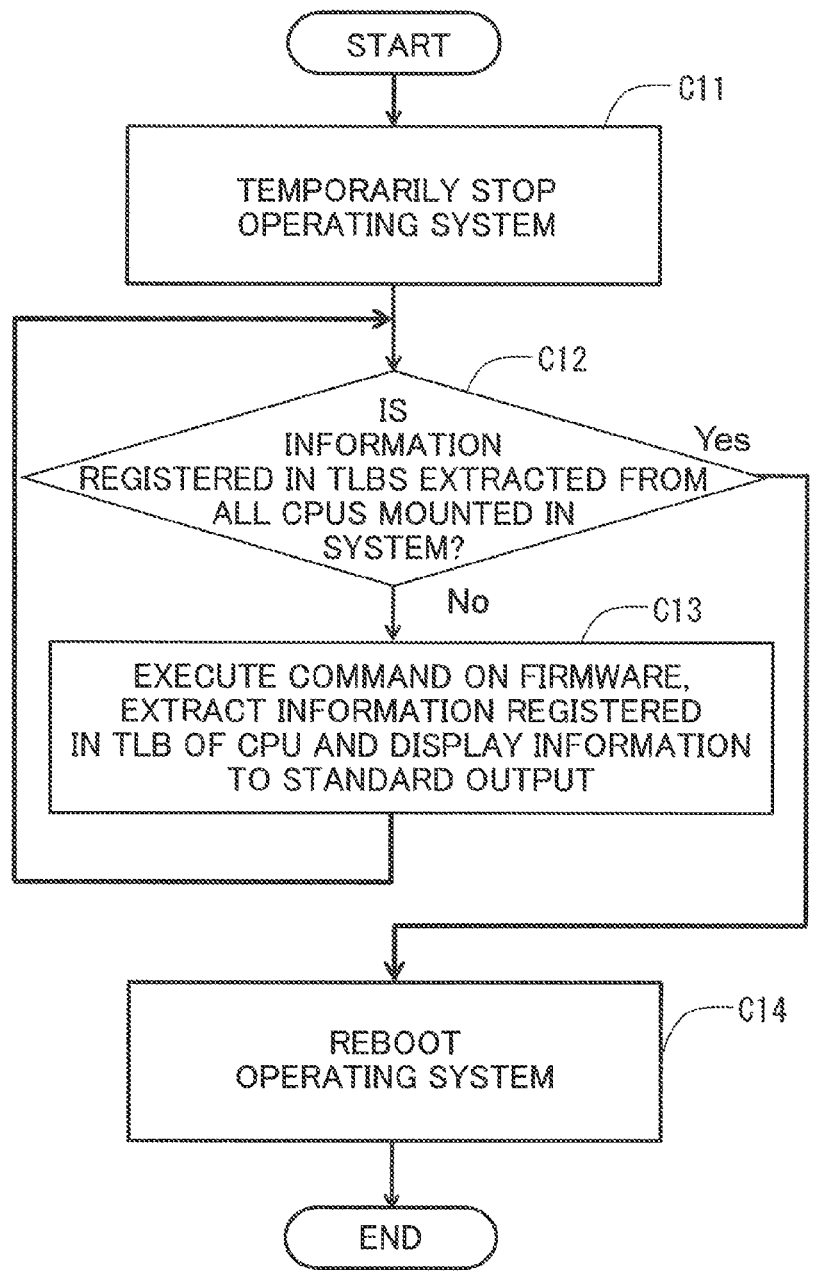
FIG. 3 is a flowchart of processes of a system given by way of a comparative example.

FIG. 3 illustrates a processing flowchart of a system given by way of a comparative example of the first working example. It is assumed that a system configuration of the comparative example is the same as in the case of FIG. 1. Processes illustrated in FIG. 3 can be, however, exemplified as processes of a tool on the firmware 12. Further, similarly to FIG. 1, it is assumed that the plurality of virtual CPUs or physical CPUs can be used within the CPU 15.

The tool in the comparative example extracts the TLB information from the single virtual CPU or physical CPU within the system. Therefore, in the case of extracting the TLB information from all of the CPUs, as in the processes of FIG. 3, the user repeatedly executes the TLB acquiring command a number of times corresponding to the number of the virtual CPUs or physical CPUs of the system. Note that in place of user's repeatedly executing the TLB extraction command, the program on the firmware 12 repeatedly issues the TLB extraction command, and the procedure is the same as in FIG. 3.

In the processes of FIG. 3, at first, the user, for example, temporarily stops the operating system 11 through the firmware 12 (Service Processor) etc. from the terminal (C11).

Next, the user determines which information registered in the TLBs is extracted from the CPUs (the virtual CPUs or physical CPUs) mounted in the system (C12).

For the CPUs (the virtual CPUs or physical CPUs) the user wants to get the information, the user executes the TLB extraction command on the firmware 12 repeatedly. Thereupon, the firmware 12 notifies the CPU 15 of the system of the CPU number of the TLB extraction target CPU and the TLB information extraction request. The CPU 15 extracts the TLB information from the virtual CPU or physical CPU specified by the designated CPU number. Then, the firmware 12 receives the extracted TLB information from the CPU 15. Subsequently, the firmware 12 displays the extracted TLB information on the standard output 17 (C13).

If the user has finished extracting the information registered in the TLB from all of the CPUs (the virtual CPUs or physical CPUs) the user wants to get the information, the user reboots the operating system 11 on the CPU 15.

<Processing Flowchart of Information Processing Apparatus 1>

Figure 4:
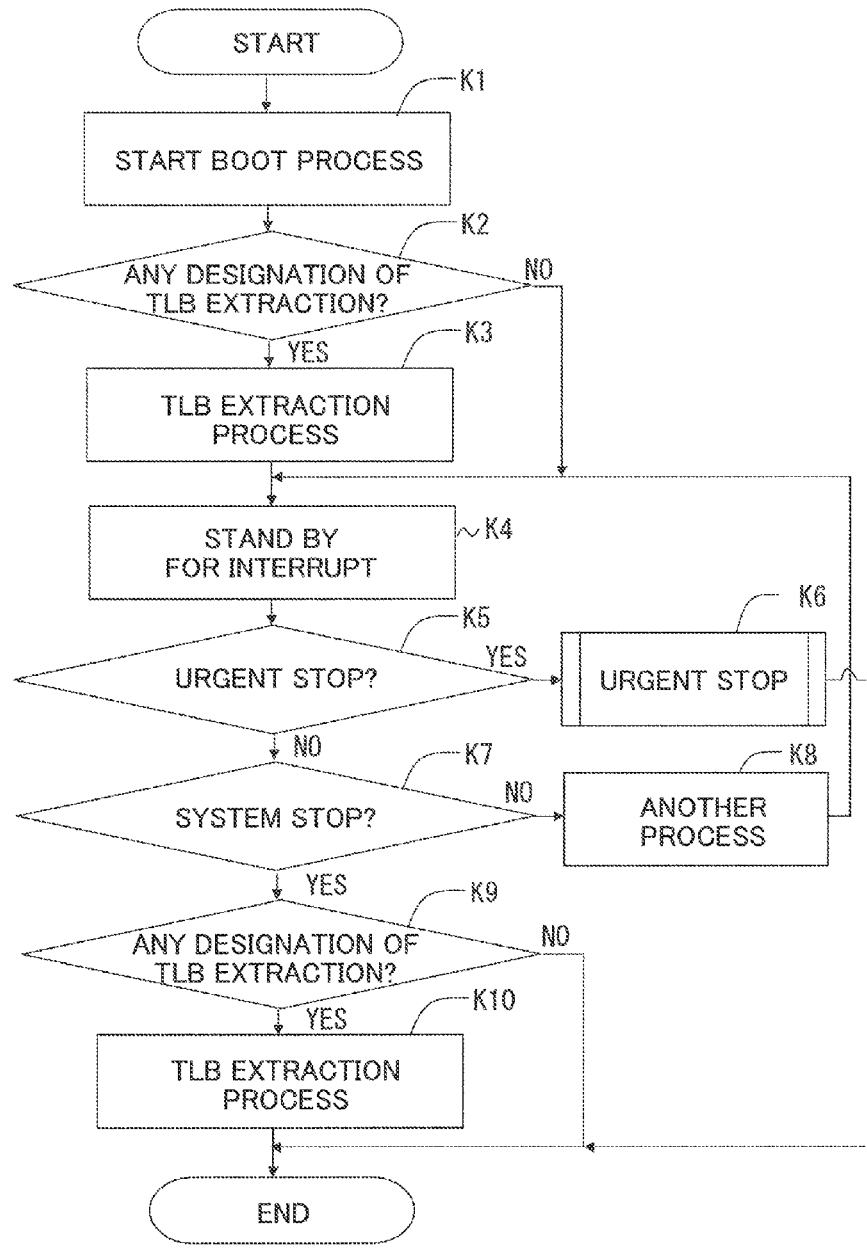
FIG. 4 is a flowchart illustrating a process from booting to stopping in the first working example.
Figure 5:
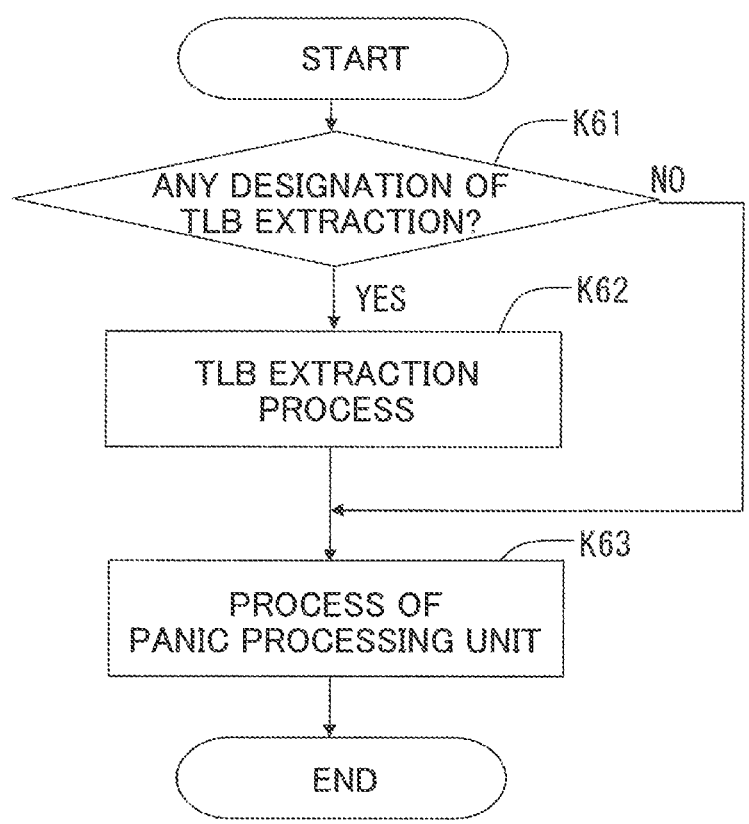
FIG. 5 is a diagram illustrating an urgent stop process.

FIGS. 4 and 5 illustrate flowcharts of the processes for extracting the TLB information in the information processing apparatus 1 according to the first working example. As described above, in the information processing apparatus 1, the CPU number of the target virtual CPU (or the physical CPU if having no structure of the virtual CPU) is described beforehand such as tlb-dump-cpu="all" in the setting file 231. Then, through the process of the information extracting unit 23 within the operating system 11, the system administrator can extract the TLB information from the designated virtual CPU or physical CPU.

Incidentally, for instance, in the case of a UltraSPARC processor system, if the CPU executing the process of the information extracting unit 23 is coincident with the extraction target CPU, the information extracting unit 23 executes the ASI command for extracting the TLB information. The ASI command for extracting the TLB information corresponds to a TLB extraction command. Note that in the case of the processor other than the UltraSPARC processor, it may be sufficient that the TLB extraction command prepared in each processor is executed.

Furthermore, whereas if the CPU executing the process of the information extracting unit 23 is not coincident with the extraction target CPU, such an instruction is given that the information extracting unit 23 executes the ASI command for transmitting the interrupt to another CPU, and the extraction target CPU executes the ASI command for extracting the TLB information. Details of the ASI command for transmitting the interrupt to another CPU are described in Chapter 9 of the Manual (UltraSPARC User's Manual Revision 2, July 1997) of the UltraSPARC processor. The ASI command for transmitting the interrupt to another CPU is called a CPU-to-CPU communication command or a cross call. Accordingly, the processor other than the UltraSPARC processor may use the CPU-to-CPU communication command prepared in each processor.

FIG. 4 is a flowchart illustrating a process from booting the operating system 11 to stopping the OS 11 on the information processing apparatus 1. In this process, it is assumed that any one of virtual CPUs (or the physical CPU if having no structure of the virtual CPU) of the CPU 15 carries out the process (which is also termed a process or thread) of the operating system 11. Further, the TLB acquiring target virtual CPU (or the physical CPU if having no structure of the virtual CPU) may be the virtual CPU (or the physical CPU if having no structure of the virtual CPU) executing the process of the operating system 11 and may also be another virtual CPU (or the physical CPU if having no structure of the virtual CPU). The following discussion will be, however, made on the assumption that the CPU 15 simply executes the processes of the operating system 11.

To begin with, upon a boot instruction given by the system administrator, the information processing apparatus 1 starts a boot process (K1). Note that the CPU 15 is notified of the boot instruction via, e.g., the firmware 12. Thereupon, after starting the boot process, the CPU 15 determines whether the TLB extracting designation is given or not (K12). The determination in K2 may be done by such an event that the CPU 15 kept in the boot process reads the setting file 231 when becoming accessible to the setting file 231. Another available reading process is, however, that the disk for booting retains the setting content of the setting file 231, and the CPU 15 reads the setting content of the setting file 231 when in the boot process. Herein, the designation of the TLB extraction connotes the designation of the TLB extraction when initializing the kernel during the boot process, i.e., the designation is tlb-dump-timing="kernel-init".

Upon the designation of the TLB extraction, the CPU 15 executes a TLB extraction process (K3). In K3, the CPU 15 executes, as the TLB extracting unit 23, the computer program included in the operating system 11.

Next, the CPU 15 comes to an interrupt standby status (K4). Note that the CPU 15 comes to the interrupt standby status also in the case of having no designation of the TLB extraction. Then, when the interrupt occurs in the CPU 15, the handler corresponding to the type of the interrupt is started up, and the process corresponding to the type of the interrupt is carried out.

For example, if the interrupt is given for instructing the urgent stop (YES in K5), the CPU 15 executes the process for the urgent stop (K6). Then, the CPU 15 finishes the process.

Moreover, if the interrupt is given for instructing not the urgent stop (NO in K5) but the system stop (YES in K7), the CPU 15 determines whether there is the designation of the TLB extraction or not (K9). Herein, "the designation of the TLB extraction" connotes the designation of the TLB extraction when stopping the system. If the designation of the TLB extraction is given, the CPU 15 executes the TLB extraction process (K10). Then, the CPU 15 finishes the process. Note that the determination in K9 may be done by such an event that the CPU 15 reads the setting file 231.

Moreover, if the interrupt is given for neither the urgent stop nor the system stop (NO in K7), the CPU 15 executes another process (K8). Thereafter, the process (thread) for executing the operating system 11 of the CPU 15 stands by for the interrupt (K4).

FIG. 5 illustrates the process of urgent stop (details of K6 in FIG. 4). The CPU 15 executes the process depicted in FIG. 5 according to the program included in the operating system 11. In this process, at first, the CPU 15 determines whether there is the designation of the TLB extraction or not (K61). The determination in K61 may be done by such an event that the CPU 15 reads the setting file 231. Herein, the designation of the TLB extraction connotes the designation of the TLB extraction when making the urgent stop, i.e., this designation is tlb-dump-timing="panic". Then, if there is the designation of the TLB extraction, the CPU 15 executes the TLB extraction process (K62). Next, the CPU 15 executes a process of the panic processing unit 22 (K63). The process of the panic processing unit 22 includes processes of, e.g., the display/record unit 221, the file synchronization processing unit 222, the kernel dump processing unit 223 and the rebooting unit 224 illustrated in FIG. 2.

FIG. 6 depicts a detailed example of the TLB extraction process. The TLB extraction process represents the details of the processes in K3, K10 in FIGS. 4 and K62 in FIG. 5. The CPU 15 functions as the TLB information extracting unit 23 by executing the program included in the operating system 11. Then, the description will be made in FIG. 6 on the assumption that the TLB information extracting unit 23 executes the process.

In the process of FIG. 6, the TLB information extracting unit 23 reads values specified by parameters tlb-dump-cpu and tlb-dump-output from the setting file 231. Then, the TLB information extracting unit 23 determines the values specified in the parameters tlb-dump-cpu and tlb-dump-output, and executes the processes corresponding to the specified values.

For example, if the value specified in the parameter tlb-dump-cpu is "panic" (YES in S12), the TLB information extracting unit 23 extracts the TLB information from the virtual CPU (or the physical CPU if having no structure of the virtual CPU) in which the panic occurs, and temporarily stores the TLB information on the memory 16 (S13).

Furthermore, if the specified value of the parameter tlb-dump-cpu is the CPU number (NO in S12 but YES in S14), the TLB information extracting unit 23 extracts the TLB information from the virtual CPU (or the physical CPU if having no structure of the virtual CPU) having the specified CPU number, and temporarily stores the TLB information on the memory 16 (S15).

Further, if the specified value of the parameter tlb-dump-cpu is "all" (NO in S12, S14 but YES in S16), the TLB information extracting unit 23 extracts the TLB information from all of the virtual CPUs (or all of the physical CPUs if having no structure of the virtual CPU) within the CPU 15, and temporarily stores the TLB information on the memory 16 (S17).

Moreover, if the specified value of the parameter tlb-dump-cpu is "none" (NO in S12, S14, S16), the TLB information extracting unit 23 does not execute the TLB extraction process (S19).

Then, for instance, if the specified value of the parameter tlb-dump-output is "file name" (YES in S21), the TLB information extracting unit 23 outputs the already-extracted TLB information, which is temporarily stored on the memory 16, to the file on the disk 14 that is specified by the file name (S22).

Further, e.g., if the specified value of the parameter tlb-dump-output is "crash-dump" (NO in S21 but YES in S23), the TLB information extracting unit 23 outputs the already-extracted TLB information, which is temporarily stored on the memory 16, together with the memory dump information when in the urgent stop of the system to the standard output 17 (S24). In the case of S24, it follows that the CPU 15 urgently stops.

Moreover, e.g., if the specified value of the parameter tlb-dump-output is "live-dump" (NO in S21, S23 but YES in S25), the TLB information extracting unit 23 outputs the already-extracted TLB information, which is temporarily stored on the memory 16, together with the memory dump information when in the normal operation without the urgent stop of the system, to the standard output 17 (S26). In the case of S26, it follows that the CPU 15 continues the processes based on the operating system 11.

Further, e.g., if the specified value of the parameter tlb-dump-output is "console" (NO in S21, S23, S25), the TLB information extracting unit 23 outputs the already-extracted TLB information, which is temporarily stored on the memory 16, with no change, to the standard output (S28).

As described above, in the first working example, the TLB information extracting unit 23 provided in the operating system 11 extracts the information registered in the TLB of the virtual CPU or the physical CPU designated in the setting file 231 at the designated timing. The designation of the timing in the setting file 231 includes, e.g., the boot time, the urgent stop time, the system stop time, etc. Further, the designation of the virtual CPU or the physical CPU in the setting file 231 includes, e.g., the designation based on the CPU number, the designation of the virtual CPU or the physical CPU which urgently stops, the designation of all the CPUs, etc. Additionally, the TLB information extracting unit 23 stores the extracted information in the output destination designated in the setting file 231. Accordingly, the information processing apparatus 1 according to the first working example can extract the information registered in the TLB of the virtual CPU or the physical CPU included in the CPU 15 for the purpose of extracting the information for examining a cause of a trouble such as a fault of the operating system 11 and performing an operation check (regression test) thereof. On the occasion of extracting the TLB information, the CPU 15 can receive the designation of the information considered by the system administrator to be effective in examining the trouble and in checking the operation. Then, the CPU 15 can select and acquire the information undergoing the designation.

For example, what is assumed is a case where the urgent stop (panic) of the system occurs in the information processing apparatus mounted with 512-pieces of logical CPUs. In the method of the comparative example, the system administrator repeatedly (512 times) executes the tool and extracts totally 2 million or more entries of address translation information registered in the TLBs of all the CPUs.

On the other hand, in the information processing apparatus 1 according to the first working example, as illustrated in FIG. 6, the system administrator can acquire the TLB information of the specified virtual CPU or physical CPU designated. Further, in the information processing apparatus 1, the system administrator can extract the information registered in the TLB of the virtual CPU or the physical CPU becoming the cause of the urgent stop (panic). Therefore, in the information processing apparatus 1, a quantity of the data to be extracted and the time expended for the extraction can be reduced to a greater degree than in the case of the comparative example.

Then, as illustrated in FIGS. 4 and 5, in the information processing apparatus 1, it is feasible to acquire the TLB information at the specified timing designated by the system administrator. Note that the information acquisition timing is not limited to the boot time, the system stop time and the urgent stop time illustrated in FIG. 4, and the information may be acquired in another process (K8 in FIG. 4).

Further, in the case of urgently stopping the system due to the occurrence of some abnormality, the system administrator may not temporarily stop the operating system 11 for executing the command with the firmware 12. In the information processing apparatus 1, the system administrator can make the setting in the setting file 231 beforehand in order to extract the information registered in the TLB. The system administrator can therefore easily extract the information registered in the TLB even when urgently stopped.

SECOND WORKING EXAMPLE

The processes of the information processing apparatus 1 according to a second working example will be described with reference to FIG. 7. The first working example has exemplified the processing example of extracting the TLB information of the specified virtual CPU or physical CPU at the timing designated by the system administrator. The second working example will discuss a processing example of extracting the TLB information of the virtual CPU or the physical CPU designated by the system administrator when the panic occurs. Other configurations and operations of the second working example are the same as in the case of the first working example. Such being the case, the descriptions of the same components as those in the first working example are omitted. Further, the following discussion will be made on the assumption that the drawings in the first working example can be applied as they are to the second working example.

FIG. 7 is a flowchart illustrating an operation of the information processing apparatus 1 according to the second working example. The second working example will discuss a process on the occasion of making the urgent stop (panic) due to the occurrence of some abnormality in the case of designating tlb-dump-cpu="0, 2" and tlb-dump-output="crashdump" in the setting file 231 beforehand. To be specific, when urgently stopped, there are extracted the information registered in the TLB of the virtual CPUs (or the physical CPUs if having no structure of the virtual CPU) specified by the CPU number "0" and the CPU number "2" and also the memory dump.

For example, when the operating system 11 detects the abnormality, the urgent stop (panic) of the information processing apparatus 1 is carried out. In the second working example, the virtual CPU (or the physical CPU) executing the operating system 11 invokes the TLB information extracting unit 23 before the urgent stop of the information processing apparatus 1. Similarly to the first working example, in the second working example also, any one of the virtual CPUs (or the physical CPUs) within the CPU 15 executes the program, which is simply expressed such that the CPU 15 executes the program. Namely, the CPU 15 executes, as the TLB information extracting unit 23, the program included in the operating system 11. The description of the process will hereinafter be made on the assumption that a main unit of executing the process in FIG. 7 is the TLB information extracting unit 23.

In the process of FIG. 7, during the running of the operating system 11, the operating system 11 detects some abnormality, e.g., the abnormality of the hardware of the information processing apparatus 1. The abnormality of the information processing apparatus 1 is detected by the process called, e.g., a trap of the hardware. Thereupon, in the virtual CPU (or the physical CPU) that is in the midst of executing the operating system 11, the handler, set in the interrupt vector, corresponding to each trap is started up. Then, the handler requests the operating system 11 for the urgent stop (S31).

The operating system 11, upon issuance of a request for the urgent stop, invokes the TLB information extracting unit 23 (S32). For example, the process in S32 may also be executed in the handler.

Then, the TLB information extracting unit 23 reads the following information from the TLB information extraction setting file 231 (S33). To be specific, with tlb-dump-cpu="0, 2"; tlb-dump-output="crash-dump"; S33, the TLB information extracting unit 23 recognizes the CPU number for specifying the processing target virtual CPU (or the physical CPU) and the output destination of the extracted TLB information.

Next, the TLB information extracting unit 23 determines whether the information registered in the TLBs of all the extraction target virtual CPUs (or the physical CPUs) is extracted or not (S34).

If the information registered in the TLBs of all the extraction target virtual CPUs (or the physical CPUs) is not extracted, the TLB information extracting unit 23 determines whether or not the virtual CPU (or the physical CPU if having no structure of the virtual CPU) executing the process of the TLB information extracting unit 23 is coincident with the TLB information extracting target virtual CPU (or the physical CPU if having no structure of the virtual CPU) (S35).

If determined not to be coincident in S35, the TLB information extracting unit 23 instructs the TLB information extracting target virtual CPU (or the physical CPU if having no structure of the virtual CPU) to execute the ASI command for extracting the TLB information. Then, as a result of the instruction, the extracted information is stored on the memory. In S36, the process of giving the instruction of the command from one virtual CPU (or the physical CPU) to another virtual CPU (or the physical CPU) is done by, e.g., notifying the CPUs of the interrupt each other. The CPU-to-CPU interrupt is also called the cross call. In another virtual CPU (or another physical CPU) undergoing the CPU-to-CPU interrupt, similarly to the normal interrupt, the control is transferred to the handler. Performed then is a predetermined process corresponding to the CPU-to-CPU interrupt, e.g., the extraction of the information registered in the TLB of the virtual CPU (or the physical CPU) that is in the midst of the execution of the handler. Moreover, the extracted information is stored in a predetermined area on the memory 16, e.g., stored in a shared memory between the plural virtual CPUs and handed over to the virtual CPU (or the physical CPU) in the midst of the execution of the TLB information extracting unit 23. The virtual CPU (or the physical CPU) in the midst of the execution of the TLB information extracting unit 23 acquires the information extracted by the virtual CPU (or the physical CPU) giving the instruction of executing the ASI command and temporarily stores the acquired information on the memory 16 (S36).

Whereas if determined to be coincident in S35, the TLB information extracting unit 23 executes the ASI command for extracting the TLB information in the virtual CPU (or the physical CPU) in the midst of the execution of the TLB information extracting unit 23. Then, the TLB information extracting unit 23 temporarily stores the extracted information on the memory 16 (S37). Subsequently, the TLB information extracting unit 23 returns the control to S34.

When extracting the information registered in the TLBs from all the extraction target virtual CPUs (or the physical CPUs), the TLB information extracting unit 23 advances the control to S38. Then, there is executed the process of the panic processing unit 22 such as a panic message process by the display/record unit 221, a file system process by the file synchronization processing unit 222 and a process by the kernel dump processing unit 223. In the second working example, the TLB information extracted by the TLB information extracting unit 23 is output to the output destination of the kernel dump processing unit 223. Then, the rebooting unit 224 reboots the information processing apparatus 1 (S38).

As described above, the TLB information extracting unit 23 in the second working example extracts, based on the setting in the TLB information extraction setting file 231, the information registered in the TLBs from the virtual CPUs (or the physical CPUs) of which the CPU numbers are 0 and 2, and stores the extracted information on the memory. Thereafter, the urgent stop (panic) of the system is carried out, and the extracted TLB information is output as the crash dump to the dump file.

Note that the second working example has exemplified the instance of acquiring the TLB information when urgently stopped, however, the TLB extraction process can be also executed at the timing designated by the system administrator, by carrying out the processes depicted in FIGS. 4 and 5 in the first working example.

That is, according to the information processing apparatus 1 in the second working example, the TLB information can be extracted from the specified virtual CPU or the specified physical CPU at the timing designated by the system administrator, e.g., when making the urgent stop. Then, the extracted TLB information can be output to the output destination designated by the system administrator.

THIRD WORKING EXAMPLE

The processes of the information processing apparatus 1 according to a third working example will be described with reference to FIG. 8. The first working example has exemplified the processing example of extracting the TLB information of the specified virtual CPU or physical CPU at the timing designated by the system administrator. The second working example has discussed the processing example of extracting the TLB information of the virtual CPU or the physical CPU designated by the system administrator when the panic occurs. On the other hand, the third working example will discuss a processing example of acquiring the TLB information when the system administrator presses the switch 13 equipped in the information processing apparatus 1. Other configurations and operations of the third working example are the same as in the case of the first working example or the second working example. Such being the case, the descriptions of the same components as those in the first working example or the second working example are omitted. Further, the following discussion will be made on the assumption that the drawings in the first and second working examples can be applied as they are to the third working example.

FIG. 8 is a flowchart illustrating processes when the system administrator presses the switch 13 equipped in the information processing apparatus 1. Note that what is assumed in FIG. 8 is a case where tlb-dump-cpu="all", tlb-dump-output="crash-dump" are previously designated in the setting file 231. The TLB extraction process of the information processing apparatus 1 is not necessarily, however, limited to tlb-dump-cpu="all", tlb-dump-output="crash-dump", and the processes in the third working example can be similarly applied to other settings.

To start with, upon pressing the switch 13 provided on the information processing apparatus 1, the firmware 12 notifies the CPU 15 (the virtual CPU or the physical CPU allocated to the operating system 11) of the interrupt. When the CPU 15 receives the interrupt, the handler corresponding to the interrupt is started up by using the interrupt vector, and the operating system 11 receives the interrupt (S41).

The operating system 11, upon receiving the interrupt corresponding to the press on the switch 13, invokes the TLB information extracting unit 23 (S42).

The TLB information extracting unit 23 reads the following information from the setting file 231 (S43). Namely, with tlb-dump-cpu="all"; tlb-dump-output="crash-dump"; S43, the TLB information extracting unit 23 recognizes the CPU number for specifying the processing target virtual CPU (or physical CPU) and the output destination of the extracted TLB information. The processes in S43-S48 are the same as the processes in S33-S38 in FIG. 7, and hence their descriptions are omitted. In FIG. 8, however, the information registered in the TLBs of all the virtual CPUs or physical CPUs is extracted.

As described above, when the switch 13 equipped in the information processing apparatus 1 is pressed, the TLB information extracting unit 23 extracts the information registered in the TLB from the specified virtual CPU or physical CPU according to the designation in the setting file 231, and outputs the extracted information to the designated output destination. Accordingly, the information processing apparatus 1 extracts the TLB information from the designated target at the designated timing even by the procedure in the third working example, and can provide the extracted TLB information to the system administrator.

For instance, if disabled from logging in the system that hangs up due to the occurrence of some abnormality and if disabled from using the terminal for performing the command operation, such a case might arise that the tool for outputting the information registered in the TLB of each CPU (the virtual CPU or the physical CPU) cannot be executed. Accordingly, the cause for the trouble such as the fault of the operating system 11 cannot be examined as the case may be because of being disabled from extracting the information registered in the TLB of each CPU.

According to the processes in the third working example, the TLB information extracting unit 23 automatically extracts the information registered in the TLB of the CPU designated beforehand by the computer administrator at the timing designated by the computer administrator via the switch 13, and stores the extracted information in the output destination designated by the system administrator. Moreover, if disabled from logging in the information processing apparatus 1 that hangs up and if disabled from using the terminal for performing the command operation, it is feasible to promptly extract the information for examining the cause of the trouble and execute the recovery process of the information processing apparatus 1.

FOURTH WORKING EXAMPLE

The first through third working examples described above have exemplified the processing examples of acquiring the TLB information of the specified virtual CPU or physical CPU at the timing designated by the system administrator. A fourth working example will discuss a processing example of locking a TLB entry for obtaining a physical address stored with the ASI command to be executed on the occasion of acquiring the TLB information. Other configurations and operations of the fourth working example are the same as in the case of the first working example. Such being the case, the descriptions of the same components as those in the first through third working examples are omitted. Further, the following discussion will be made on the assumption that the drawings in the first through third working examples can be applied as they are to the fourth working example.

During the running of the operating system 11, the information registered in the TLB of each CPU (the virtual CPU or the physical CPU) is frequently updated. In the case of extracting the TLB information with the external tool such as the command of the firmware 12 for the purpose of examining the cause of the trouble and checking the operation, there is a case where the information registered in the TLB is updated during the information extraction process. Thereat, such a case might arise that the extracted information is coincident with neither the information registered in the TLB when the problem occurs nor the information registered in the TLB at the timing designated by the system administrator. Then, as a result of the discrepancy of the information, inconvenience is caused in the analysis of the problem as the case may be. For restraining the occurrence of the inconvenience, for instance, it is considered that the operating system 11 is temporarily stopped. Even the process of temporarily stopping the operating system 11 has, however, a possibility of updating the information registered in the TLB of each CPU (the virtual CPU or the physical CPU).

FIG. 9 is a flowchart illustrating a process of locking the TLB entry corresponding to a memory area in which a command code and a data field of the TLB information extracting unit 23 are arranged. For example, in the case of the UltraSPARC processor system, the TLB is provided with a lock bit. Then, the information processing apparatus 1 of the fourth working example sets the lock bit so as not to delete the TLB entry associated with an address located on the memory on the occasion of arranging the command code (ASI command) and the data field of the TLB information extracting unit 23 on the memory. The TLB entry undergoing the setting of the lock bit is inhibited from being rewritten, thus keeping the information of the TLB entry.

Note that the TLB entry is locked, and the command code (ASI command) and the data field of the TLB information extracting unit 23 may be arranged in the memory area corresponding to the previously locked TLB entry in place of using the locked TLB entry. Further, the command code (ASI command) and the data field may also be arranged in real addresses associated with virtual addresses on the memory, which are registered (locked) in the TLB beforehand. In short, the processes in the fourth working example retrain the information in the TLB entry from being updated by dint of an adverse effect accompanying the execution of the command code (ASI command) for extracting the TLB information.

The processes in FIG. 9 may be executed, e.g., when booting the operating system 11, by the virtual CPU or the physical CPU which boots the operating system 11. The following discussion will be made on the assumption that the processes in FIG. 9 are executed by the CPU 15.

In the processes in FIG. 9, at first, the CPU 15 ensures the virtual memory area for arranging the TLB information extracting unit 23 (S1).

Next, the CPU 15 ensures the physical memory area corresponding to the virtual memory area (S2).

Subsequently, logical/physical address translation information is created, the lock bit is set, and these items of information are registered in the TLB (S3). The CPU 15 executes the process in S3 as a means to lock the entry registered with the information and inhibit the already registered information from being rewritten.

Then, the CPU 15 arranges the program of the operating system 11 that corresponds to the TLB information extracting unit 23 and the storage location of the extracted information on the memory 14 corresponding to the locked TLB (S4). The CPU 15 executes the process in S4 as a means to register the TLB access command.

Through the processes described above, it is feasible to restrain the TLB entry from being deleted or updated, which accompanies the issuance of the ASI command for extracting the TLB information based on the execution of the TLB information extracting unit 23. That is, the information registered in the TLB is restrained form being updated due to the execution of the process of the TLB information extracting unit 23. Hence, there increases a possibility of enabling the acquisition of the information registered in the desired TLB entry at the timing desired by the system administrator.

Details of the method of locking the TLB entry (lock bit) are described in Chapter 6 of the Manual (UltraSPARC User's Manual Revision 2, July 1997) of the UltraSPARC processor. The function of locking the TLB entry is, however, provided to the processor other than the UltraSPARC processor according to the architecture of each processor. Accordingly, the processes in the fourth working example can be applied in the same procedure to the processor other than the UltraSPARC processor.

In the information processing apparatus 1 according to the fourth working example, the information registered in the TLB of the CPU can be extracted and stored while running the operating system 11. The conventional method entails temporarily stopping the operating system in order to prevent the information registered in the TLB from being updated, and has the possibility that the information registered in the TLB is updated by the stopping process thereof. In the information processing apparatus 1 according to the fourth working example, however, the TLB is locked so that the associated address translation information is not deleted from the TLB on the occasion of arranging the command code of the TLB information extraction process and the data field on the memory, or alternatively the address translation information is located on the virtual address previously registered (locked) in the TLB. Consequently, the information registered in the TLB is restrained from being updated in a way that executes the command code. Accordingly, it is possible to extract the information needed for examining the cause of the trouble and checking the operation without stopping the operating system 11 for the TLB extraction.

<<Non-Transitory Computer-Readable Recording Medium>>

A program for making a computer, other machines or devices (which will hereinafter be referred to as the computer etc.) realize any one of the functions can be recorded on a recording medium readable by the computer etc. Then, the computer etc. is made to read and execute the program on this recording medium, whereby the function thereof can be provided.

Herein, the recording medium readable by the computer etc. connotes a recording medium capable of accumulating information such as data and programs electrically, magnetically, optically, mechanically or by chemical action, which can be read from the computer etc. Among these recording mediums, for example, a flexible disc, a magneto-optic disc, a CD-ROM, a CD-R/W, a DVD, a BD (Blu-ray Disc), a DAT (Digital Audio Tape), an 8 mm tape, a memory card such as a flash memory, etc. are given. And a hard disk or a ROM etc. is given as a recording medium fixed in the computer etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

The invention claimed is:

1. An information processing apparatus, comprising:
a plurality of processing units each having a TLB (Translation Lookaside Buffer),
wherein at least one of the plurality of processing units is configured to:
acquire, from a TLB information extraction setting file, a designation of the processing unit from which TLB information is to be extracted in the plurality of processing units and a designation of a timing when the TLB information is to be extracted;
extract the TLB information from the designated processing unit at the designated timing specified based on the TLB information extraction setting file;
inhibit the registered information from being rewritten, by locking an entry contained in the TLB and registered with information; and
register a TLB extraction command for extracting the TLB information on a memory accessed by using the locked entry.

2. An information processing method executed by a computer including a plurality of processing units each having a TLB (Translation Lookaside Buffer), comprising;
acquiring, from a TLB information extraction setting file, a designation of the processing unit from which TLB information is to be extracted in the plurality of processing units and a designation of a timing when the TLB information is to be extracted;
extracting the TLB information from the designated processing unit at the designated timing specified based on the TLB information extraction setting file;
inhibiting the registered information from being rewritten, by locking an entry contained in the TLB and registered with information; and
registering a TLB extraction command for extracting the TLB information on a memory accessed by using the locked entry.

3. A non-transitory computer readable medium storing a program which makes a computer including a plurality of processing units each having a TLB (Translation Lookaside Buffer) execute;
acquiring, from a TLB information extraction setting file, a designation of the processing unit from which TLB information is to be extracted in the plurality of processing units and a designation of a timing when the TLB information is to be extracted;
extracting the TLB information from the designated processing unit at the designated timing specified based on the TLB information extraction setting file;
inhibiting the already-registered information from being rewritten, by locking an entry contained in the TLB and registered with information; and
registering a TLB extraction command for extracting the TLB information on a memory accessed by using the locked entry.

4. An information processing apparatus, comprising:
a plurality of processing units each having a TLB (Translation Lookaside Buffer),
wherein at least one of the plurality of processing units is configured to:
acquire, from a TLB information extraction setting file, a designation of the processing unit from which TLB information is to be extracted in the plurality of processing units and a designation of a timing when the TLB information is to be extracted;
extract the TLB information from the designated processing unit at the designated timing specified based on the TLB information extraction setting file; and
stop the designated processing unit after the TLB information is extracted in the case a stop of the designated processing unit is designated as the designated timing when the TLB information is to be extracted.

5. The information processing apparatus according to claim 4, wherein at least one of the plurality of processing units is further configured to acquire the designation of the plurality of processing units that the TLB information is to be extracted.

6. An information processing method executed by a computer including a plurality of processing units each having a TLB (Translation Lookaside Buffer), comprising;

acquiring, from a TLB information extraction setting file, a designation of the processing unit from which TLB information is to be extracted in the plurality of processing units and a designation of a timing when the TLB information is to be extracted;

extracting the TLB information from the designated processing unit at the designated timing specified based on the TLB information extraction setting file; and stopping the designated processing unit after the TLB information is extracted in the case a stop of the designated processing unit is designated as the designated timing when the TLB information is to be extracted.

7. The information processing method according to claim 6, wherein the acquiring acquires the designation of the plurality of processing units that the TLB information is to be extracted.

8. A non-transitory computer readable medium storing a program which makes a computer including a plurality of processing units each having a TLB (Translation Lookaside Buffer) execute;

acquiring, from a TLB information extraction setting file, a designation of the processing unit from which TLB information is to be extracted in the plurality of processing units and a designation of a timing when the TLB information is to be extracted;

extracting the TLB information from the designated processing unit at the designated timing specified based on the TLB information extraction setting file; and stopping the designated processing unit after the TLB information is extracted in the case a stop of the designated processing unit is designated as the designated timing when the TLB information is to be extracted.

9. The non-transitory computer readable medium according to claim 8, wherein the acquiring acquires the designation of the plurality of processing units that the TLB information is to be extracted.

* * * * *